US012439929B2

(12) United States Patent
Tiecher

(10) Patent No.: US 12,439,929 B2
(45) Date of Patent: Oct. 14, 2025

(54) MACHINE FOR CLEANING FOWL GIBLETS

(71) Applicant: Mauro Tiecher, Chapecó (BR)

(72) Inventor: Mauro Tiecher, Chapecó (BR)

( * ) Notice: Subject to any disclaimer, the term of this patent is extended or adjusted under 35 U.S.C. 154(b) by 295 days.

(21) Appl. No.: 18/249,680

(22) PCT Filed: Dec. 31, 2020

(86) PCT No.: PCT/BR2020/050640
§ 371 (c)(1),
(2) Date: Apr. 19, 2023

(87) PCT Pub. No.: WO2022/082280
PCT Pub. Date: Apr. 28, 2022

(65) Prior Publication Data
US 2023/0380432 A1    Nov. 30, 2023

(30) Foreign Application Priority Data
Oct. 19, 2020    (BR) ...................... 10 2020 021320 2

(51) Int. Cl.
*A22C 21/00*    (2006.01)
(52) U.S. Cl.
CPC ...... *A22C 21/0061* (2013.01); *A22C 21/0053* (2013.01)
(58) Field of Classification Search
CPC . A22C 21/06; A22C 21/0061; A22C 21/0052; A22B 5/18
USPC ........................................................ 452/114
See application file for complete search history.

(56) References Cited

U.S. PATENT DOCUMENTS

| | | | |
|---|---|---|---|
| 3,711,897 A * | 1/1973 | Viscolosi | A22C 21/06 452/118 |
| 4,570,296 A | 2/1986 | Hill et al. | |
| 4,815,166 A | 3/1989 | Martin et al. | |
| 5,041,053 A * | 8/1991 | Ellis | A22C 21/06 452/120 |
| 5,186,678 A * | 2/1993 | Conner | A22C 21/06 452/106 |
| 8,439,730 B1 | 5/2013 | Gasbarro | |

FOREIGN PATENT DOCUMENTS

| | | |
|---|---|---|
| BR | 8203073 | 8/2004 |
| BR | MU8601815 | 4/2008 |
| BR | MU 8702054 | 8/2009 |

(Continued)

OTHER PUBLICATIONS

International Search Report for PCT/BR2020/050640 dated Jun. 26, 2022.
Written Opinion for PCT/BR2020/050640 dated Jun. 26, 2022.

*Primary Examiner* — Richard T Price, Jr.
(74) *Attorney, Agent, or Firm* — B. Aaron Schulman, Esq.; Stites & Harbison, PLLC

(57) ABSTRACT

A machine for cleaning fowl giblets, which comprises pre-cleaning rollers positioned underneath a guiding assembly for directing the giblets to a chain for gripping and conveying the giblets to a pressing assembly via a cutting element and a unit for washing the giblets. The machine also has a first steering element arranged beside a second steering element, in which the first steering element extends along the length of a cleaning assembly. This cleaning assembly is arranged underneath the pressing assembly and underneath the steering elements.

20 Claims, 11 Drawing Sheets

(56) References Cited

FOREIGN PATENT DOCUMENTS

| | | |
|---|---|---|
| BR | 202012009010 | 4/2016 |
| BR | 202015018345 | 2/2017 |
| BR | 202016020834 | 3/2018 |
| BR | 202017012153 | 12/2018 |
| BR | 202017016221 | 3/2019 |
| WO | WO0057072 | 12/2001 |

\* cited by examiner

MACHINE FOR CLEANING FOWL GIBLETS

BACKGROUND OF THE INVENTION

The present invention relates to an apparatus for cleaning poultry giblets, particularly used to promote the removal of residues from giblets, such as gizzards, hearts and/or similar, of chickens, hens, or other slaughter birds. This apparatus is designed to perform cleaning more efficiently throughout the entire apparatus itself, also featuring an innovative cleaning assembly and enabling easy adjustment of the bearings of the bearing components of such apparatus.

Apparatuses for poultry giblets processing are well known for those of ordinary skill in the art of poultry processing.

These apparatuses were developed to fulfill safety requirements, to avoid work accidents, as well as to reduce the need of manual labor during selection and cleaning of giblets from slaughtered birds, which are widely marketed in the food industry worldwide. Thus, for such giblets to be marketed properly and with increased added value, after the extraction of the giblets from the carcasses of slaughtered birds, the removal of residual parts attached to the giblets is necessary.

Initially, the processing of these giblets was performed manually by human labor, to clean each piece individually, resulting in low productivity, high rate of repetitive strain injuries (RSI), and work accidents.

Therefore, apparatuses were developed to automate poultry giblets processing, and the removal of residual parts of the giblets is performed by a variety of components that act at different stages during this cleaning process.

Some examples of apparatuses designed to fulfill different specific functions, within the scope of giblets processing, are presented by the Brazilian patent documents BRMU8203073-1, BR202015018345-9, BR202016020834 9, and BR202017012153-0, all owned by the same applicant of this invention. Such documents present specific improvements in the apparatuses and devices used for cleaning giblets.

Nevertheless, despite visible improvements in the automation of the giblets cleaning processes, the applicant, continuing his studies in the field, observed the necessity of the development of a poultry giblet cleaning apparatus that could provide a more efficient cleaning, while facilitating the operation and maintenance of the bearings of the bearing components installed in these apparatuses.

Thus, disadvantageously, current apparatuses do not comprise cleaning components strategically associated with a cleaning assembly capable of performing a more efficient cleaning, in order to provide giblets with greater added value for commercialization.

Furthermore, disadvantageously, current apparatuses have bearings positioned in hard-to-reach places, and it is often necessary to remove other components from the apparatus to access its bearings components. In addition, it is necessary to loosen and retighten several screws to perform the adjustment of each bearing.

In order to solve these inconveniences from the state of the art, the present invention proposes an apparatus for cleaning poultry giblets, providing improved cleaning components associated with a more efficient cleaning assembly, and also providing a system for adjusting bearings installed in positions with easy access in the apparatus.

Thus, it is an objective of the present invention to provide an apparatus for cleaning poultry giblets, with the cleaning assembly associated with strategically positioned guiding and pressing elements, directing the giblets to be cleaned in a more efficient cleaning flow.

In addition, it is also an objective of the present invention to provide an apparatus for cleaning poultry giblets, wherein bearings are installed in places not obstructed by other components of the apparatus where they are applied, allowing easy positioning adjustment of the bearing components in this apparatus, for different types of products/batches with different dimensional characteristics.

Advantageously, the present invention introduces an apparatus and a method for cleaning poultry giblets, with a simple and safe design, resulting in cleaned giblets with quality gains, in increasing productivity, and in preparations for operation and in maintenance with the possibility of precise adjustments of the apparatus elements.

Schematic drawings of a particular embodiment of the invention can herein be seen. The dimensions and proportions presented in these schemes are not necessarily the real ones, as the drawings are only intended to didactically present its various aspects. The scope of protection is determined only by the scope of this document claims.

DESCRIPTION OF THE INVENTION

As represented by the accompanying drawings, the machine M for cleaning poultry giblets (not shown) is provided with an inlet gutter M0 and a giblet outlet gutter M6. Therefore, the giblets (not shown) enter the machine M through the inlet gutter M0, and the entire cleaning process is conducted inside the machine M. Afterwards, the giblets (not shown) are dispensed through the outlet gutter M6.

As Illustrated by the accompanying figures, the machine M comprises a first pre-cleaning roller 3 and a second pre-cleaning roller 4, responsible to perform an initial cleaning of the giblets (not shown), promoting the separation of the giblet viscera package (not shown) as soon as they enter the machine M through the inlet gutter M0. Thus, automatically, only the giblets (not shown) without viscera (not shown) continue in the cleaning process performed by the machine M.

The beforementioned pre-cleaning rollers 3 and 4 are arranged under a guiding assembly M1, directing the giblets (not shown) to a gripping and transporting conveyor chain M2 for transporting the giblets (not shown) from the pre-cleaning rollers 3 and 4 to a pressing assembly M5, passing through a cutting element M3 and a washing assembly M4 for giblets (not shown).

Figure 11:
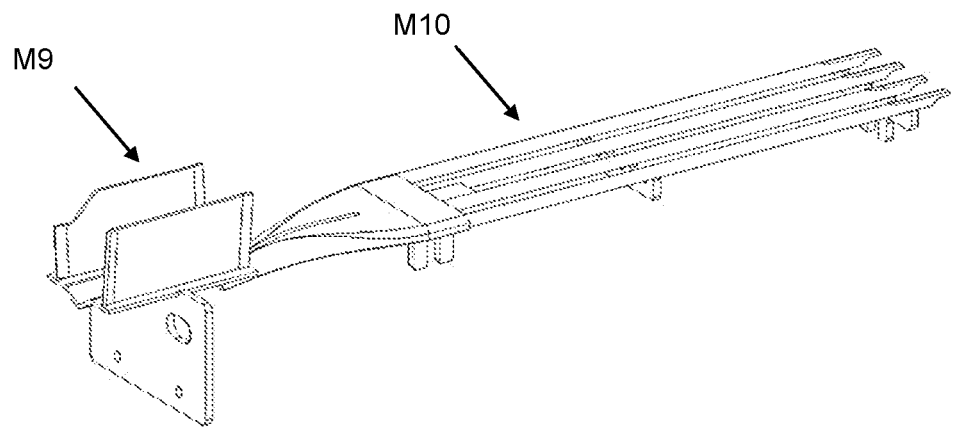
FIG. 11 shows a perspective view of the opening and cleaning guide M10 and the opening gutter M9.

As illustrated in FIG. 11, an opening and cleaning guide M10 and the opening gutter M9 of the giblets (not shown) are applied under the gripping and transporting conveyor chain M2, in such a way that during the transport of the giblets (not shown) by the gripping and transporting conveyor chain M2, the opening and cleaning guide M10 and the opening gutter M9 allow convenient cutting and opening of the giblets (not shown), after passing through the cutting element M3, so the giblets can be cleaned more efficiently, while they cross the washing assembly M4 and the opening and cleaning guide M10

Figure 3:
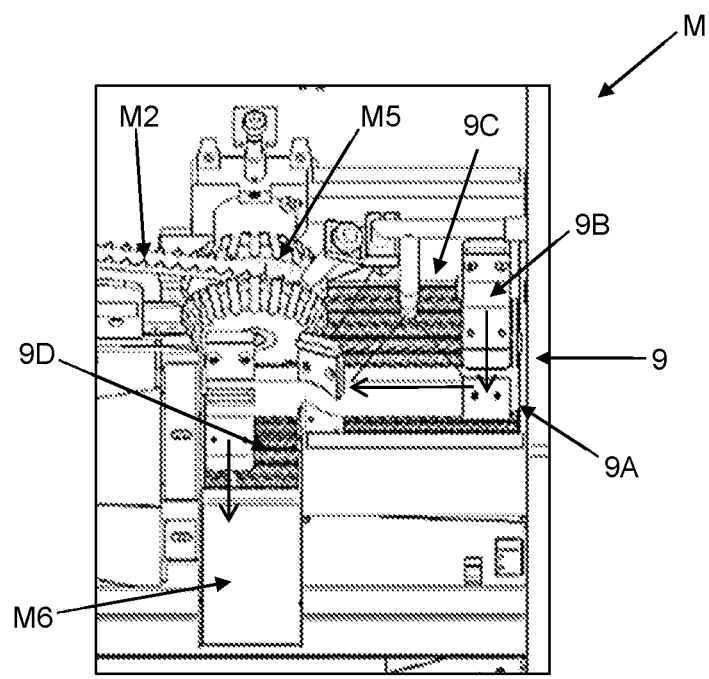
FIG. 3 illustrates an enlarged partial front perspective view of the machine M, emphasizing the cleaning assembly 9 region.

As illustrated by FIG. 3, the machine M also comprises a first guiding element 9A arranged alongside a second guiding element 9B, with the first guiding element 9A extending along the length of a cleaning assembly 9. This cleaning assembly 9 is arranged under the pressing assembly M5 and under the guiding elements 9A and 9B.

Therefore, the second guiding and pressing element 9B is arranged in line with the pressing assembly M5, both of which have the primary function of guiding the giblets (not shown) over the cleaner assembly and have the secondary function of pressing the giblets (not shown) against the cleaning assembly 9.

Thus, while the second guiding element 9B directs the giblets (not shown) only in the direction of the first guiding element 9A, said first guiding element 9A moves the giblets (not shown) back and forth over the cleaning assembly 9. In addition, the first guiding element 9A directs the giblets (not shown), that have already passed through this back and forth region, towards the outlet gutter M6 (see arrows indicating this direction in the FIG. 3).

Preferably, the cleaning assembly 9 comprises cleaning and guiding elements 90 installed between an inlet and outlet support 91 and on an opposite support 92, which support the edges 902 of each cleaning and directing element 90 to form a cleaning inlet region 9C and a cleaning outlet region 9D.

Thus, the cleaning inlet region 9C is aligned with the pressing assembly M5 and with the second guiding element 9B, while the cleaning outlet region 9D is aligned with the first guiding element 9A and it has the function of directing the giblets (not shown) to the outlet gutter M6.

Also preferably, each cleaning and guiding element 90 comprises guiding elements 900 distributed along its entire contact surface 901 with the giblets (not shown), and such guiding elements 900 are responsible for defining a directing flow of giblets (not shown), along with the movement of the cleaning and guiding elements 90 relative to one other.

Figure 4:
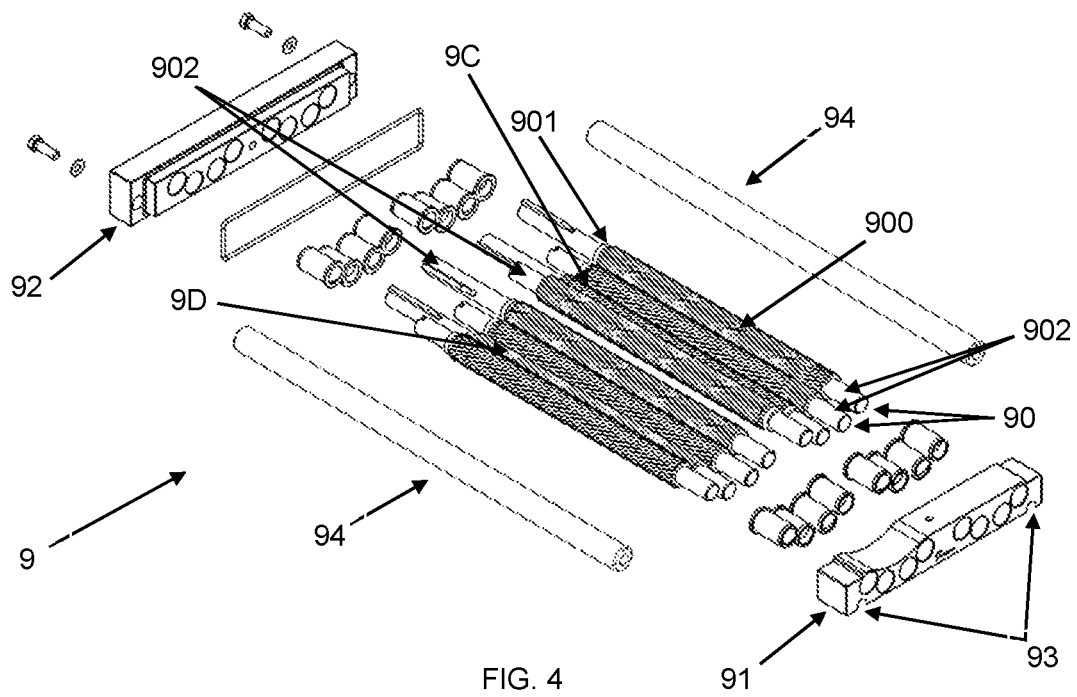
FIG. 4 illustrates an exploded perspective view of the cleaning assembly 9.
Figure 5:
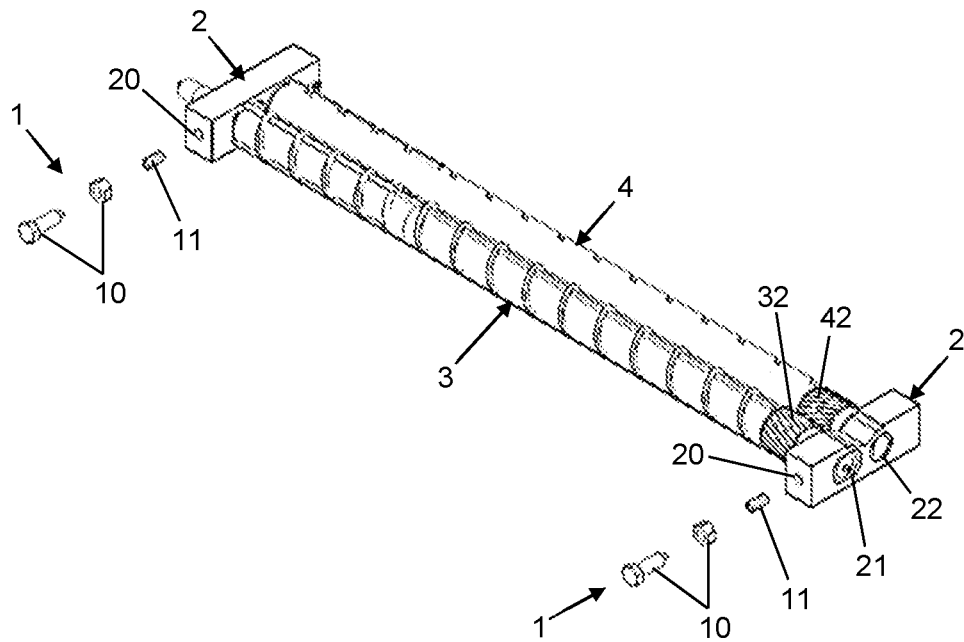
FIG. 5 illustrates a perspective view of a preferred application of the adjusting devices 1.

Preferably, as illustrated by FIG. 4, the cleaning assembly 9 comprises the cleaning and guiding elements 90 set in groups in a manner that the directions of their respective guiding elements 900 are pointed to opposite sides relative to one other, and at least two of such groups are arranged in the cleaning inlet region 9C, and at least more two of such groups are arranged in the cleaning outlet region 9D.

Thus, each group of cleaning and guiding elements 90 works in an opposite direction relative to the direction of an adjacent group of cleaning and guiding elements 90, creating opposite directing flows in each of the regions 9C and 9D.

Thus, the relative movement of each group of cleaning and guiding elements 90 directs the giblets (not shown) to one side, while the adjacent group of cleaning and guiding elements 90 directs the giblets (not shown) to the opposite side, generating the forward and backward directing flow.

As a result, the giblets (not shown) certainly move over different groups of cleaning and guiding elements 90, and they are directed back and forth along the cleaning assembly 9.

As an example of a preferred embodiment of this invention, each group of cleaning and guiding elements 90 is composed of two cleaning and guiding elements 90, and its guiding elements 900 are arranged diagonally along the contact surface 901 of each cleaning and guiding element 90.

Thus, these guiding elements 900 of each cleaning and guiding element 90 are positioned in directions concurrent with directions of the guiding elements 900 of the other cleaning and guiding element 90 belonging to a same group of cleaning and guiding elements 90, forming arrows that point to one direction or to the opposite one.

However, it would be understood that other forms of guiding elements 900 may be used, as long as they act to point each group of cleaning and guiding elements 90 in opposite directions alternately.

Furthermore, it can be understood that the quantity of cleaning and guiding elements 90 of each group of cleaning and guiding elements 90 may also vary, depending on the characteristics of the giblets (not shown), the shapes of the guiding elements 900, and the very own dimensions of the cleaning and guiding elements 90.

Figure 9:
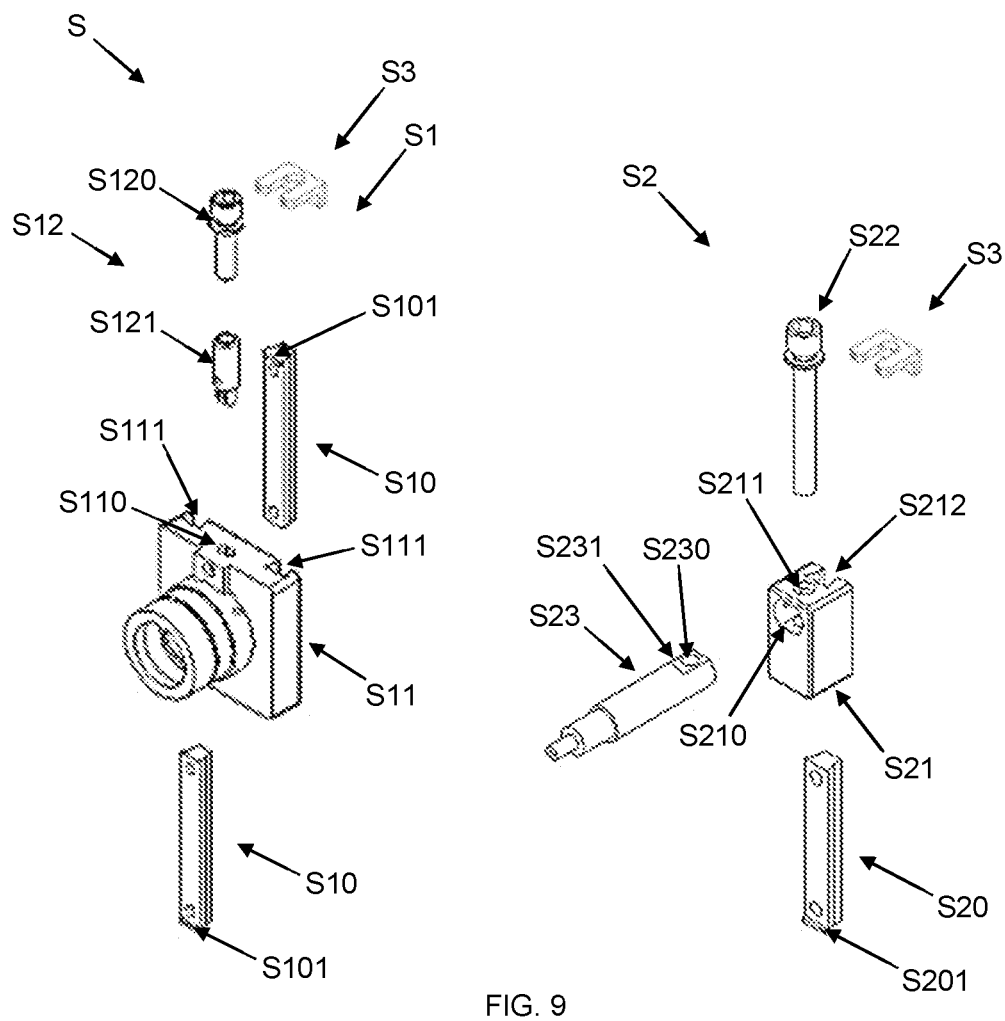
FIG. 9 illustrates an exploded front perspective view of the system S, emphasizing a first bearing assembly S1 and a second bearing assembly 52.
Figure 10:
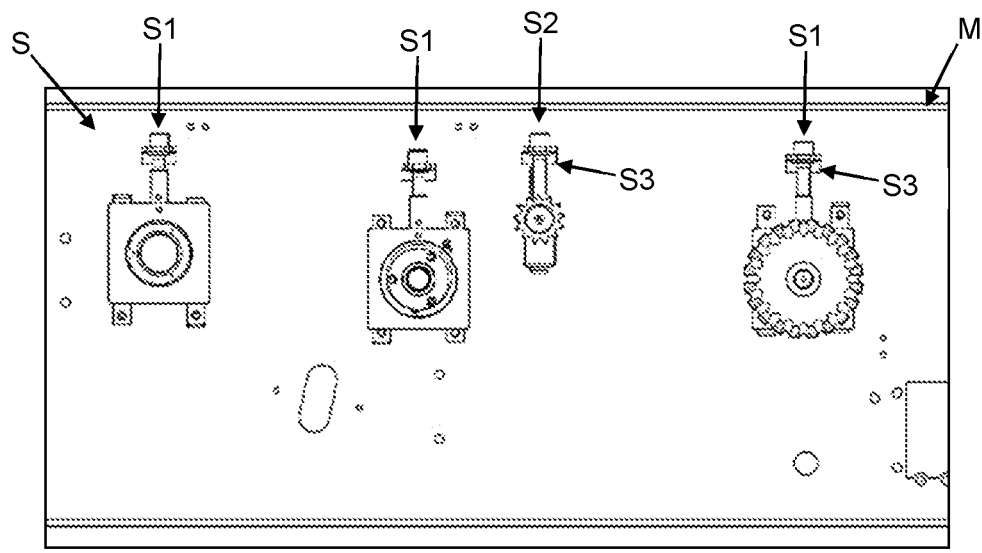
FIG. 10 illustrates an enlarged partial schematic front view of the machine M, emphasizing a preferred application of the system S.

As illustrated by FIGS. 9 and 10, the machine M also comprises a system S for adjusting the bearings of various components of said machine M.

The system S comprises two first bearing assemblies S1 and two second bearing assemblies S2, for easy adjustment of the position of different specific components of the machine M that are installed in these bearing assemblies S1 and S2.

Additionally, as illustrated by FIG. 9, the system S comprises parallel guiding rails S10 for sliding a first body S11 of the first bearing assembly S1, in a manner that said first body S11 can be easily moved throughout these parallel guiding rails S10.

Thus, each parallel guiding rail S10 is conveniently fixed to the machine M, and the first body S11 can be moved throughout the parallel guiding rails S10 by the triggering of a first lead screw device S12, which can be easily accessed by an operator (not shown), from the front of the machine M and without the need to remove other components from the apparatus, except for the opening of their respective protective covers M70, if there is any.

The first body S11 comprises a hole S110 to connect the first body S11 to the first lead screw device S12. Furthermore, preferably, the first lead screw device S12 comprises a triggering element S120, such as a screw, supported on a retaining support S3 fixed to the machine M. The body of the triggering element S120 passes through the retaining support S3, and it is fixed to a connecting element S121, such as a threaded sleeve.

Said connecting element S121 is conveniently statically fixed in the hole S110 of the first body S11 so that the rotation of the triggering element S120 results in the movement of the connecting element S121 throughout the triggering element S120, moving the first body S11 with it.

As illustrated by FIG. 9, the first body S11 comprises parallel ducts S111 to receive the parallel guiding rails S10. Said parallel ducts S111 and parallel guiding rails S10 shapes are complementary to one other, promoting proper fitting and allowing the parallel ducts S111 to slide throughout the parallel guiding rails S10.

Preferably, both parallel ducts S111 and parallel guiding rails S10 have a trapezoidal shape, facilitating the fitting between themselves and allowing the vertical movement of the first body S11, while preventing orthogonal movements of the first body S11 relative to the parallel guiding rails S10.

Furthermore, as illustrated by FIG. 9, the parallel guiding rails S10 comprise first limit stops S101 limiting the movement of the first body S11. Moreover, preferably, each parallel guiding rail S10 comprises a single first limit stop S101. As a preferred embodiment of the invention, a parallel guiding rail S10 may comprise an upper first limit stop S101, while another parallel guiding rail S10 may comprise a lower first limit stop S101.

Additionally, as illustrated by FIG. 9, the system S comprises one single guiding rail S20 to slide a second body S21 of a second bearing assembly S2, in a manner that said second body S21 can be easily moved throughout said single guiding rail S20.

Thus, the single guiding rail S20 is conveniently fixed to the machine M, and the second body S21 can be moved throughout the single guiding rail S20 by the triggering of the second lead screw device S22, which can also be easily accessed by an operator (not shown) from the front of the machine M and without the need of removing other components from the apparatus, aside from the simple opening of their respective protective covers M70, if there is any.

As illustrated by FIG. 9, the second body S21 comprises a connecting horizontal hole S210 to the beveled end S231 of a shaft S23, in order to prevent rotational movements of said shaft S23 inside the horizontal hole S210.

Furthermore, this beveled end S231 is provided with a first vertical hole S230, while the second body S21 comprises a second vertical hole S211 that communicates with the horizontal hole S210, which is aligned with the first vertical hole S230, in the shaft S23 mounting position through the horizontal hole S210.

Therefore, when the shaft S23 is inserted inside the horizontal hole S210, the two vertical holes S230 and S211 assume positions aligned with one other, allowing the shaft S23 to be connected with the second lead screw device S22.

Said second lead screw device S22 is preferably configured by a screw, which is supported on a retaining support S3 (see FIG. 10) fixed to the machine M so that its head is supported on said retaining support S3 while its body simultaneously crosses the retaining support S3 and the second vertical hole S211, allowing it to connect with the first vertical hole S230 of the shaft S23.

Thus, the second lead screw device S22, such as a screw, is conveniently fixed and, preferably, threaded, in the vertical hole S230 of the shaft S23 so that the rotation of the second lead screw device S22 results in the vertical movement of the shaft S23, moving the second body S21 with it as well.

As illustrated by FIG. 9, the second body S21 comprises a single duct S212 for receiving the single guiding rail S20. The single duct S212 and the single guiding rail S20 shapes are complementary to one other, promoting proper fitting and allowing the single duct S212 to slide throughout the single guiding rail S20.

Preferably, both the single duct S212 and the single guiding rail S20 have a trapezoidal shape, facilitating the fitting between themselves and allowing the vertical movement of the second body S21, while preventing orthogonal movements of the second body S21 relative to the single guiding rail S20.

Furthermore, as illustrated by FIG. 9, the single guiding rail S20 comprises at least a second limit stop S201 limiting the movement of the second body S21. Moreover, preferably, the single guiding rail S20 comprises a single second limit stop S201. As an alternative embodiment of the invention, the single guiding rail S20 may further comprise a lower second limit stop S201.

In addition, preferably, the machine M comprises a first auxiliary washing assembly M4A facing the region defined between the cleaning cylinders 32 and 42 and the beginning of the gripping and transporting conveyor chain M2, providing sanitation of this region.

Figure 6:
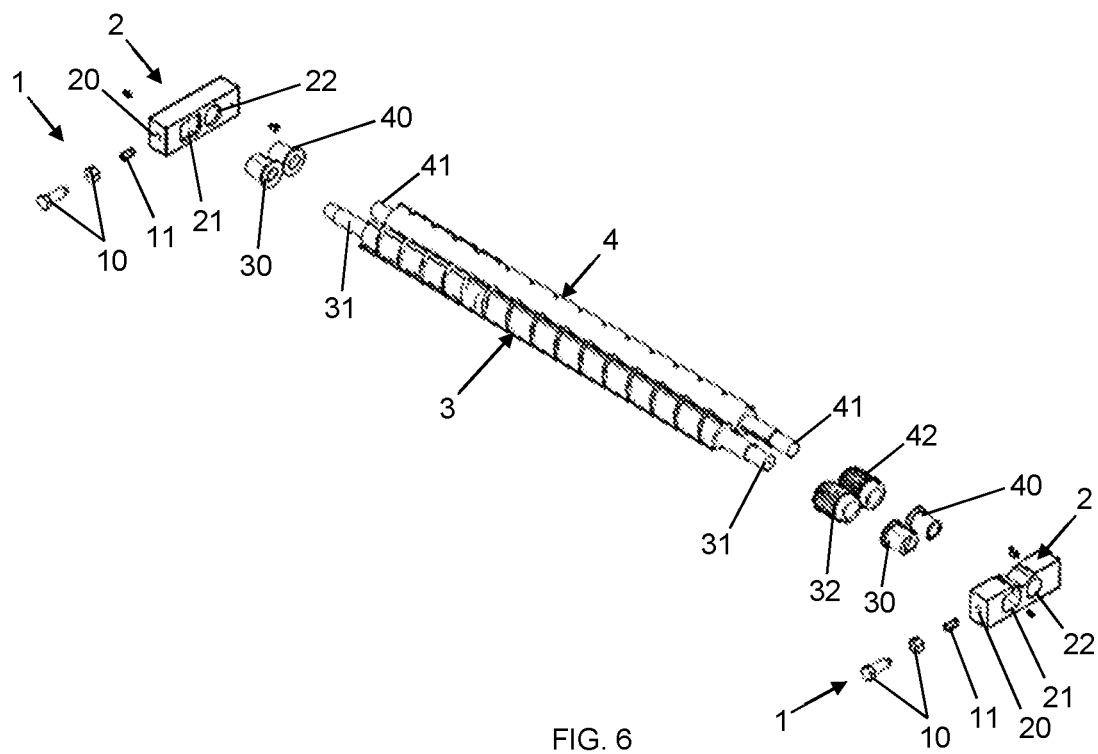
FIG. 6 illustrates an exploded perspective view of a preferred application of the adjusting devices 1.

As illustrated by FIG. 6, preferably, the machine M comprises adjusting devices 1 installed on a pair of self-compensating bearing assemblies 2 to promote adjustment of the position and relative distance between the first pre-cleaning roller 3 and the second pre-cleaning roller 4 of the giblets (not shown).

The adjusting devices 1 are in the front region of the machine M, in such a way that an operator (not shown) can have easy access to it, and without the hindering from any machine M component to this access. Thus, said adjusting devices 1 are set to establish a convenient distance between the pre-cleaning rollers 3 and 4, according to each application needed.

In an embodiment of the invention, in gizzard cleaning applications, the distance between the pre-cleaning rollers 3 and 4 should vary according to the dimensions of these gizzards (not shown). It is well known for those of ordinary skill in the art of poultry processing that gizzards begin to wilt after just a few hours since the slaughter of the birds (not shown).

Thus, the time required to transport the gizzards (not shown) from the slaughterhouse to the processing facility, where they are processed, directly influences the dimensions of these gizzards (not shown) and, consequently, requires adjustment in the distance between the pre-cleaning rollers 3 and 4, thereby processing the gizzards (not shown) with higher quality and productivity.

Moreover, as illustrated by FIG. 6, each self-compensating bearing assembly 2 comprises a duct 20 that accommodates an adjusting device 1 of the position of the first pre-cleaning roller 3.

Therefore, the adjusting devices 1 allow the self-compensating bearing assemblies 2 to provide a shift in the position of the first pre-cleaning roller 3, which moves relative to the second pre-cleaning roller 4 whenever it is necessary, in a manner that the adjusting devices 1 themselves force the first pre-cleaning roller 3 to return to its initial position as soon as possible.

This displacement of the position of the first pre-cleaning roller 3 occurs mainly when the giblets (not shown) contain, inside of them, small solid objects, such as stones or metals previously swallowed by the slaughtered birds (not shown).

Thus, the self-compensating bearing assemblies 2 allow the first pre-cleaning roller 3 to move away from the second pre-cleaning roller 4 when they act to remove these solid objects from the interior of the giblets (not shown), preventing the pre-cleaning rollers 3 and 4 from get stuck. Similarly, as soon as the solid objects are removed from the interior of the giblets (not shown), the adjusting devices 1 act so that the first pre-cleaning roller 3 approaches the second pre-cleaning roller 4 again.

For this purpose, preferably, as illustrated in FIG. 6, each self-compensating bearing assembly 2 comprises a first oblong hole 21 to accommodate an adapting sleeve 30 which is slidable inside the first oblong hole 21 and receives one edge 31 of the first pre-cleaning roller 3.

In addition, the first oblong hole 21 is interconnected with the duct 20 so that each adjusting device 1 is in direct contact with an adapting sleeve 30 for displacement of the first pre-cleaning roller 3 inside the respective self-compensating bearing assembly 2.

Furthermore, preferably, as illustrated in FIG. 6, each adjusting device 1 comprises an adjustable triggering element 10, such as a screw with a nut, capable of regulating its actuating position and its reach inside the duct 20. In addition, each adjusting device 1 also comprises a resilient element 11, such as a spring, arranged in constant contact with the adjustable triggering element 10.

Thus, each resilient element 11 is preferably arranged in contact with an adapting sleeve 30, in such a way that the resilient element 11 allows the adapting sleeve 30 and the first precleaning roller 3 to slide together but forces the adapting sleeve 30 back to its initial position, in the first oblong hole 21 of the self-compensating bearing assembly 2, whenever it is possible.

Furthermore, each self-compensating bearing assembly 2 comprises a hole 22 to accommodate an adapting sleeve 40, which is fixed inside the hole 22 and receives one of the ends 41 of the second pre-cleaning roller 4. Thus, the second pre-cleaning roller 4 rotates around its own axis, without moving inside the self-compensating bearing assemblies 2.

In addition, preferably, the first pre-cleaning roller 3 comprises a cleaning cylinder 32 adjacently arranged to one of the adapting sleeves 30, and the second pre-cleaning roller 4 comprises a cleaning cylinder 42 adjacently arranged to one of the adapting sleeves 40. Thus, the cleaning cylinders 32 and 42 are responsible for effectively removing the residual parts of the giblets (not shown).

Figure 7:
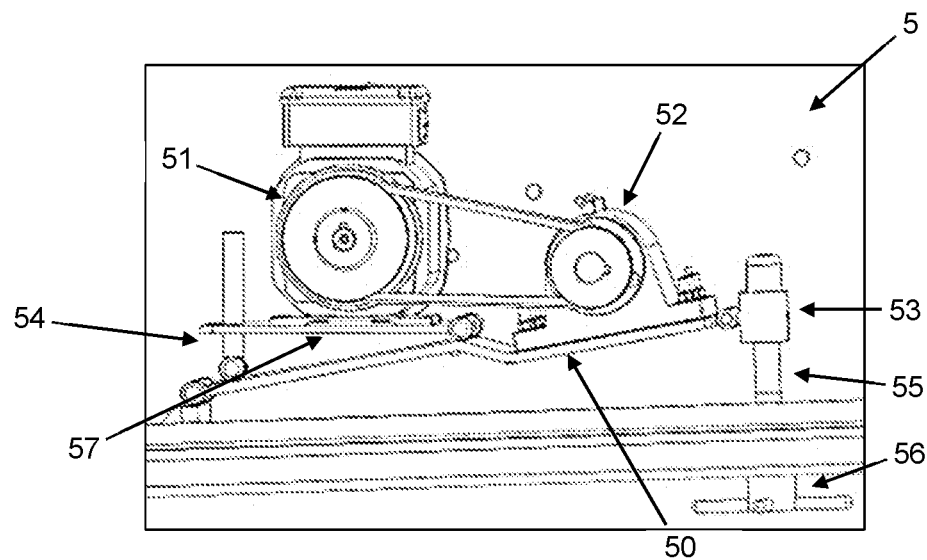
FIG. 7 illustrates an enlarged partial schematic perspective view of a rear region of the machine M, emphasizing the adjustment assembly 5.

As illustrated by FIG. 7, the machine M also comprises an adjustment assembly 5 provided with a main base 50 to support a bearing 52 of the cutting element M3 shaft. The adjustment assembly 5 also comprises a secondary base 57 for supporting a motor 51. The adjustment assembly 5 further comprises a belt tensioning device 54 and a regulating element 53 movable along an adjusting element 55. The adjusting element 55 is provided with a handler 56 used to manually adjusting the relative position of the regulating element 53 along the adjusting element 55. The regulating element 53 is connected with the main base 50, and its movement results in a consequent position adjustment of the bearing 52.

Thus, during the installation of the adjustment assembly 5, the regulating element 53 and the belt tensioning device 54 are manually adjusted for the first and only time. Afterwards, if it is necessary to adjust the position of the cutting element M3, it is not necessary to adjust the tightening of the rotation transmission belt of the motor 51 to the bearing 52, as both are arranged on the main base 50 and the secondary base 57, and the adjustment of the position of the cutting element M3, actuated manually by adjusting the position of the adjusting element 55, is achieved by operating the handler 56, allowing the adjustment assembly 5 to readjust the tightening of the belt automatically.

Figure 12:
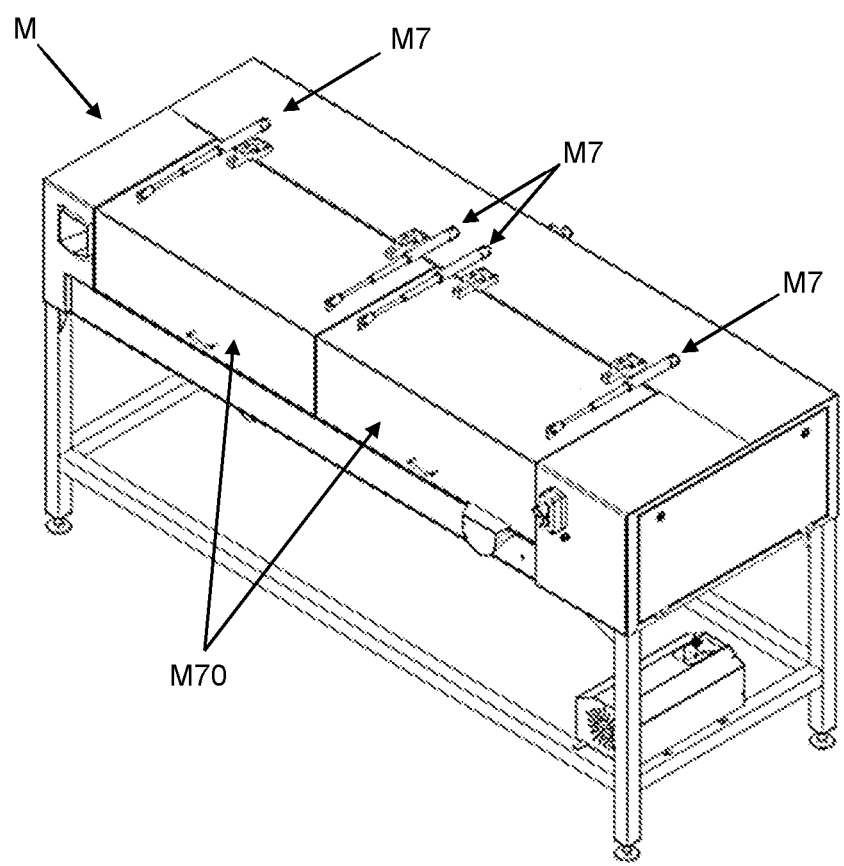
FIG. 12 illustrates a perspective view of the machine M, emphasizing the actuating elements M7 installed on the covers M70.
Figure 13:
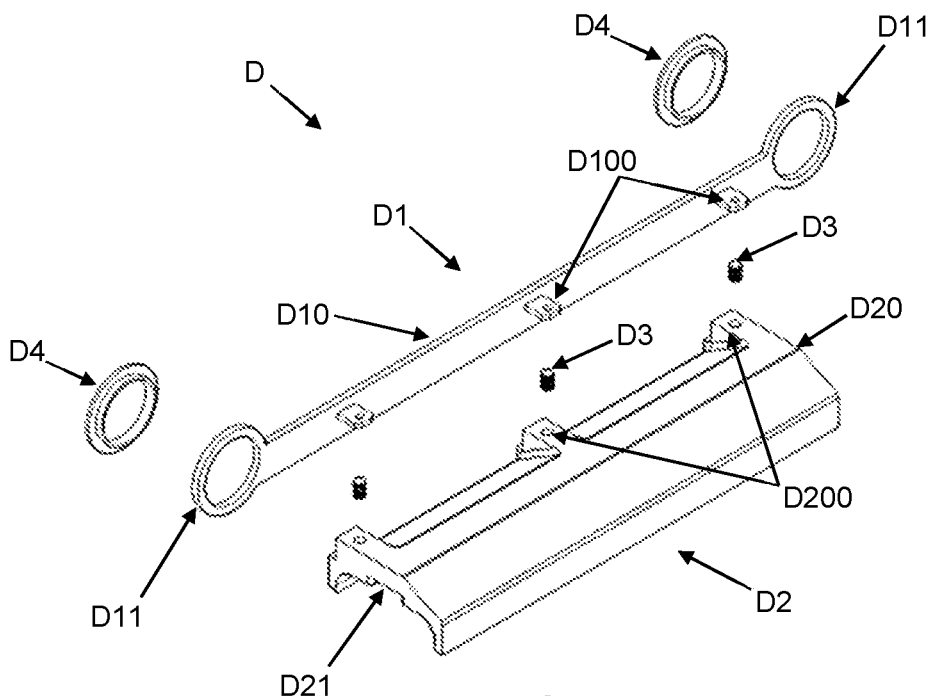
FIG. 13 illustrates an exploded perspective view of the guiding device D.
Figure 14:
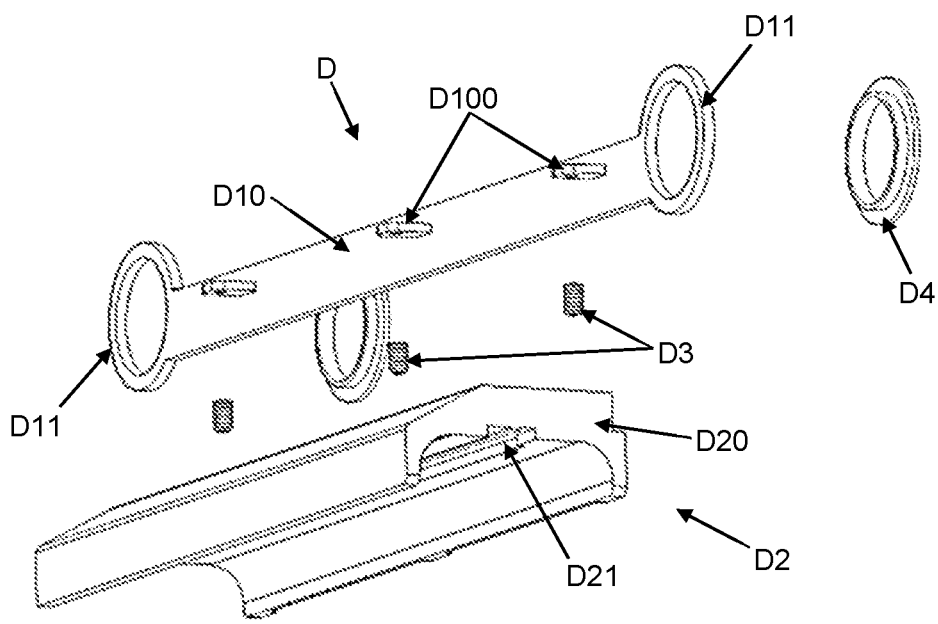
FIG. 14 illustrates an exploded bottom perspective view of the guiding device D.
Figure 15:
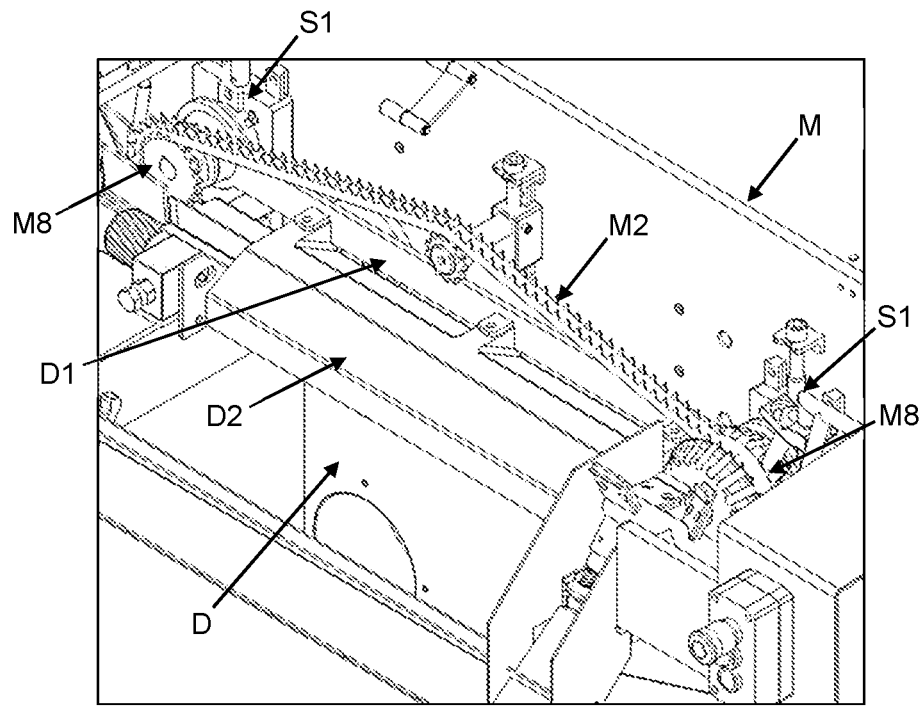
FIG. 15 illustrates a schematic partial perspective view of an embodiment of the guiding device D application in the machine M.
Figure 16:
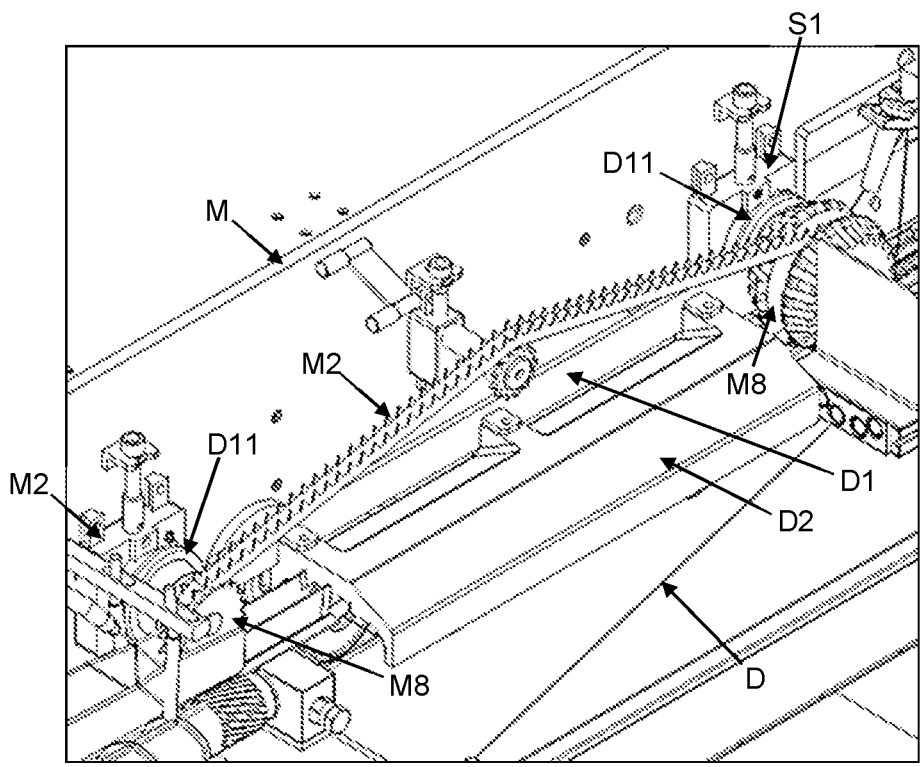
FIG. 16 illustrates a schematic partial perspective view of an embodiment of the guiding device D application in the machine M.
Figure 17:
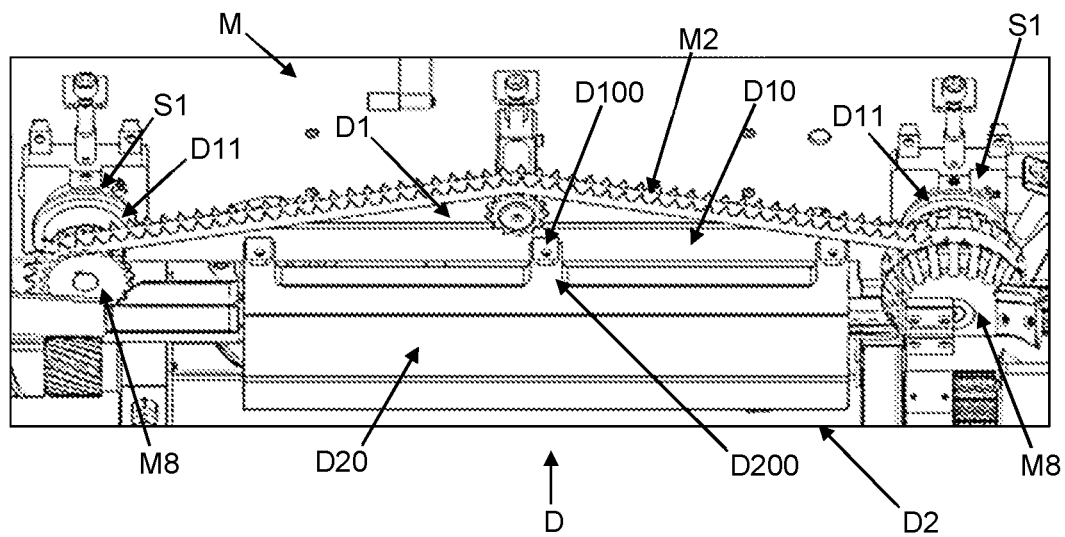
FIG. 17 illustrates a schematic partial perspective view of an embodiment of the guiding device D application in the machine M.

As illustrated by FIG. 12, preferably, the machine M also comprises actuating elements M7 for controlling the opening, closing and intermediate opening positions, of covers M70 of the machine M. This ensures operator safety (not shown) and facilitates adjustments inside the machine M.

Thus, when an operator (not shown) manually opens or closes the covers M70, said actuating elements M7, such as gas spring pistons, act to smooth the movement of the covers M70, preventing sudden movements and holding them in convenient opening positions, similarly to what occurs with car trunk lids.

Figure 8:
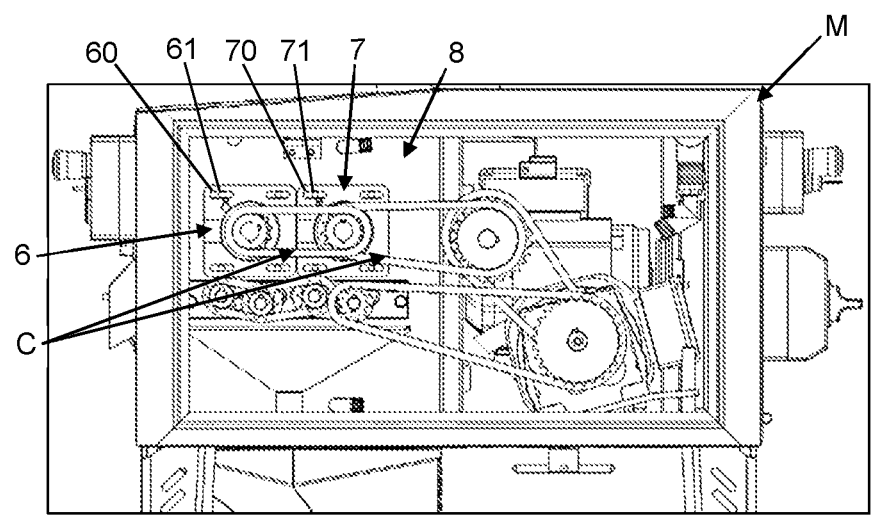
FIG. 8 illustrates an enlarged partial side view of the machine M, emphasizing an embodiment of the external bearings 6 and 7 application.

As illustrated in FIG. 8, the machine M may also comprise a first external bearing 6 of the first guiding element 9A and a second external bearing 7 of the second guiding element 9B. These external bearings 6 and 7 may be installed on the outer side of a side wall 8 of the machine M, in order to facilitate the access of an operator (not shown) during maintenance, mainly to promote the stretching of the belts C in a quick and practical way.

For this purpose, preferably, the first external bearing 6 comprises third oblong holes 60 for adjustable installation of fasteners 61 throughout each third oblong hole 60. Similarly, the second external bearing 7 comprises fourth oblong holes 70 for adjustable installation of fasteners 71 throughout each fourth oblong hole 70.

In addition, preferably, as illustrated by FIGS. 13 to 17, the machine M comprises a guiding device D of the gripping and transporting conveyor chain M2, with the displacement of the guiding device D corresponding to the displacement of the bearing assemblies S1 of the peripheral gears M8 that move the gripping and transporting conveyor chain M2. Therefore, the displacement of the guiding device D occurs automatically, together with the displacement of each bearing assembly S1. In an exemplary embodiment, said guiding device D has the configuration of a tandem, fixed in two bearing assemblies S1.

Said guiding device D comprises a supporting and protecting element D1 of a longitudinal contact element D2, and the supporting and protecting element D1 is coupled to the bearing assemblies S1, while the longitudinal contact element D2 is responsible to constantly guide and press a convenient segment of the gripping and transporting conveyor chain M2.

Moreover, the supporting and protecting element D1 comprises a support segment D10 provided with coupling edges D11 in the bearing assemblies S1. Thus, the support segment D10 is responsible for supporting the longitudinal contact element D2, conditioning its vertical displacement to the vertical displacement of the bearing assemblies S1.

Figure 1:
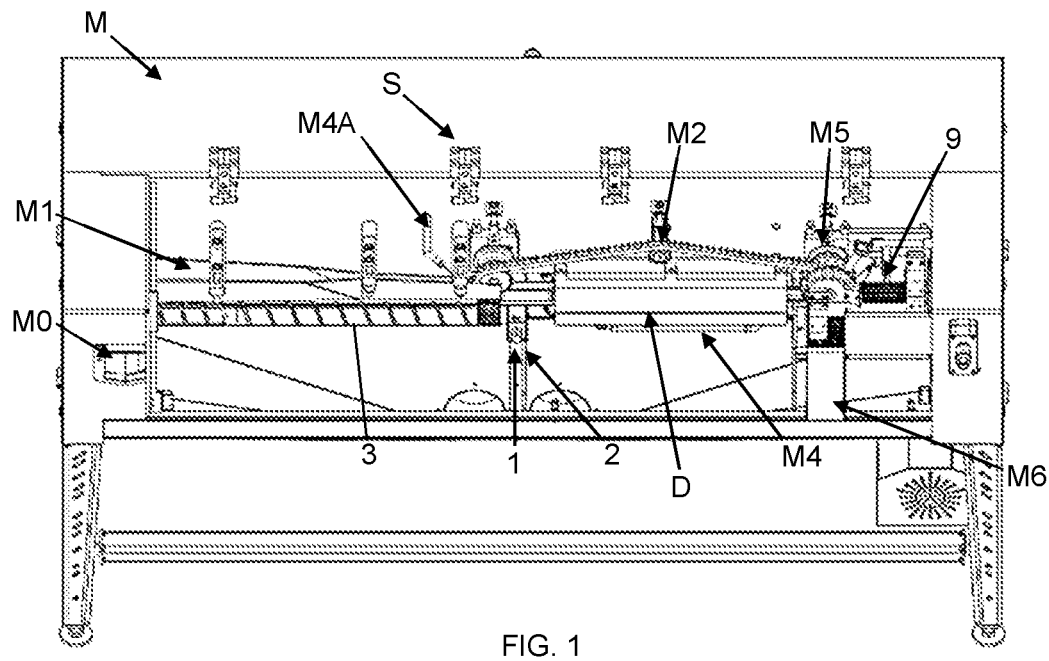
FIG. 1 illustrates a front perspective view of the machine M.
Figure 2:
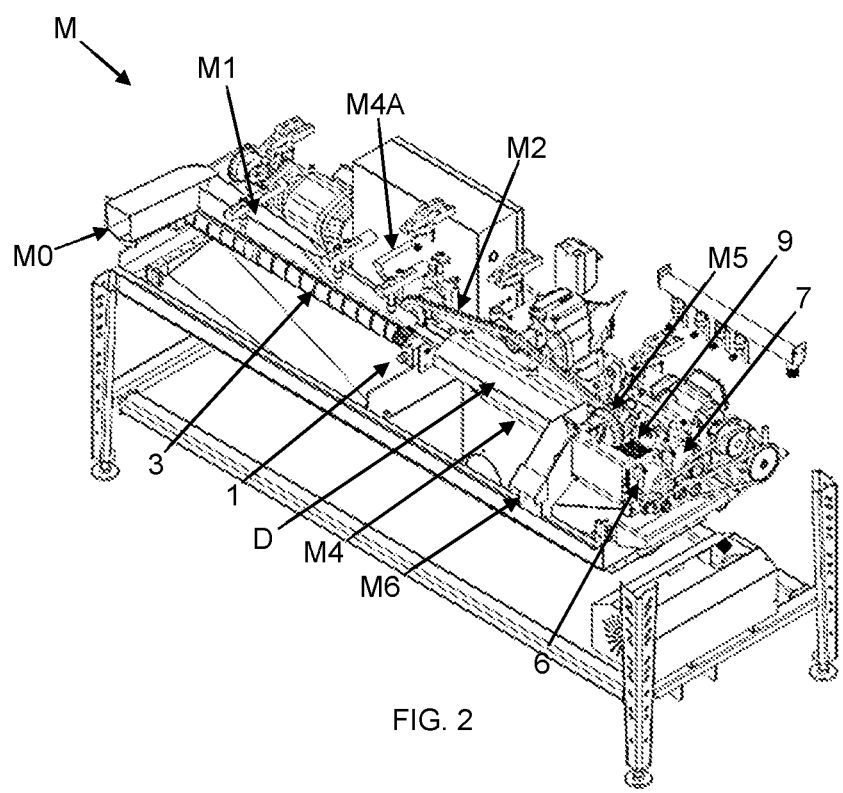
FIG. 2 illustrates a perspective view of the machine M, emphasizing its internal components.

Preferably, as illustrated by FIG. 1, each coupling edge D11 is configured by a ring with shape and dimensions corresponding to the shape and dimensions of an annular segment of each bearing assembly S1, in order to contour it and promote easy installation. However, it can be understood that each coupling edge D11 can be configured in different formats and dimensions and may be provided with other components that help in its fixation with each model of bearing M2.

Moreover, preferably, the guiding device D comprises protecting elements D4 for the fitting of the coupling edges D11 in the bearing assemblies S1, in order to avoid direct contact between each coupling edge D11 with a bearing assembly S1, in configurations in which this contact causes wear of some of the components due to their composition materials.

The longitudinal contact element D2 comprises a contact body D20, which is preferably provided with a continuous lower duct D21 for laying the gripping and transporting conveyor chain M2. Said continuous lower duct D21 extends under the entire contact body D20, and is conveniently shaped to form a rail, in which a segment of the gripping and transporting conveyor chain M2 constantly passes along, keeping it taut, guided and pressed down.

In addition, preferably, the contact body D20 comprises lower connection regions D200 arranged in positions corresponding to the positions of upper connection regions D100 of the support segment D10, in order to enable the attachment of these regions D100 and D200 to one other, facilitating the attachment of the longitudinal contact element D2 to the supporting and protecting element D1.

Thus, each upper connection region D100 can be fastened together with a lower connection region D200, in an easy way, by means of a fastening element D3.

Alternatively, the supporting and protecting element D1 and the longitudinal contact element D2 can form a single piece, without the need to use fastening elements D3.

Figure 18:
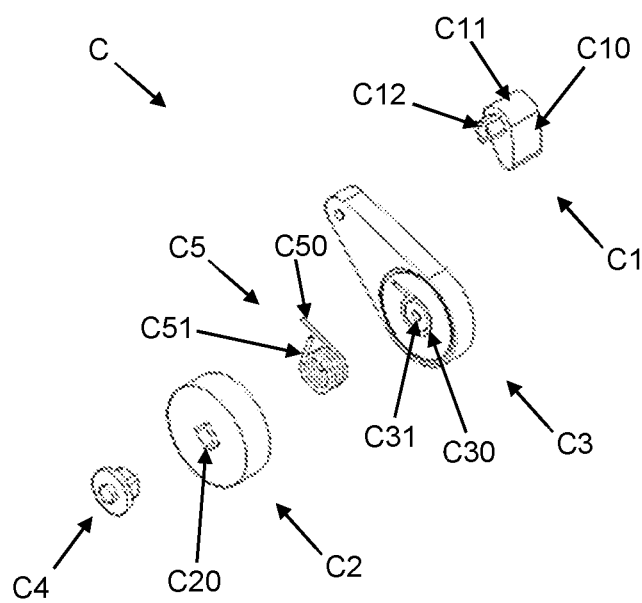
FIG. 18 illustrates an exploded perspective view of the automatic tensioner assembly C.
Figure 19:
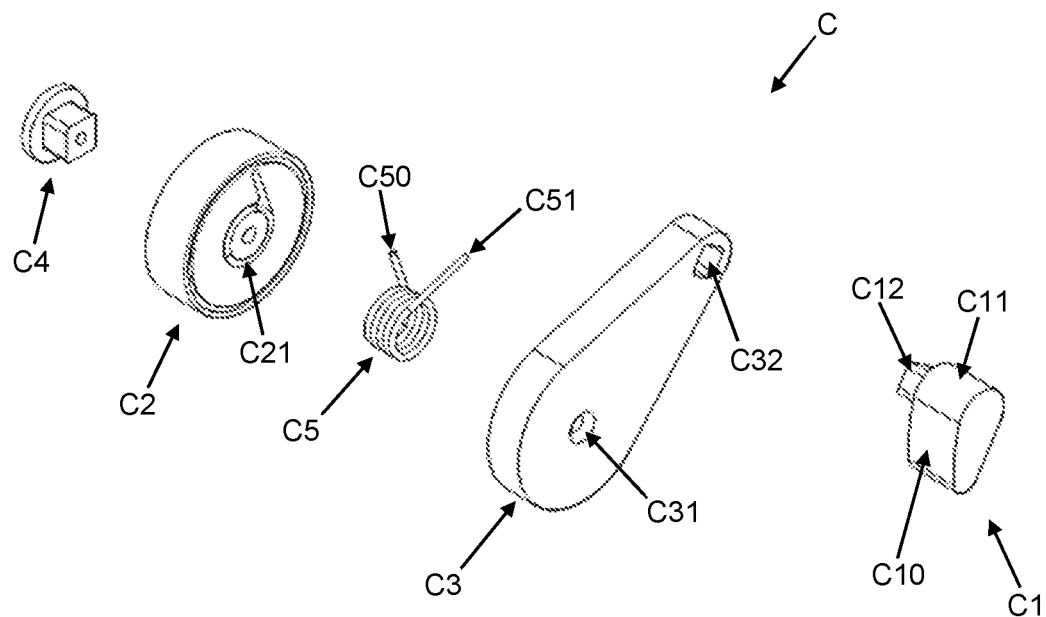
FIG. 19 illustrates an exploded rear perspective view of the automatic tensioner assembly C.
Figure 20:
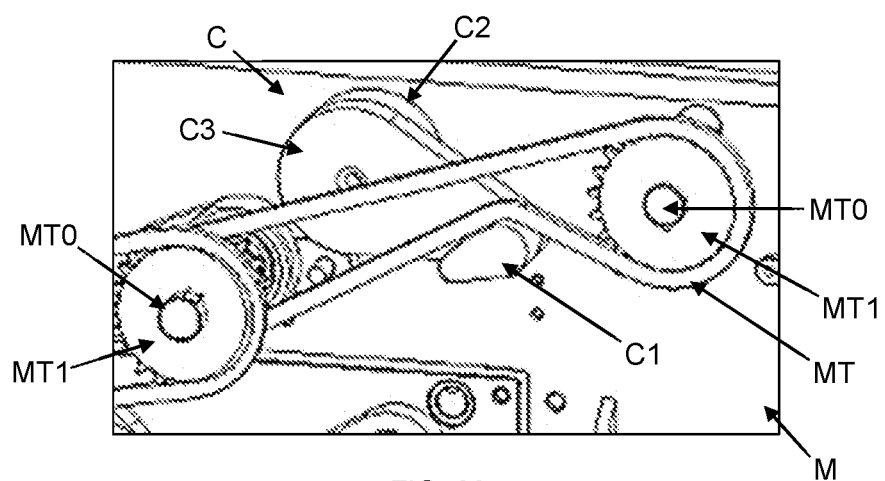
FIG. 20 illustrates a schematic partial perspective view of an embodiment of the automatic tensioner assembly C application in the machine M.

In addition, preferably, as illustrated by FIGS. 18 to 20, the machine M comprises an automatic tensioner assembly C provided with a pressing element C1, which is responsible for the contact and constant pressure of at least one transmission element MT that interconnects gears MT1 installed on shafts MT0. At least one of the shafts MT0 can be moved for adjustment of the position, resulting in a variable positioning of the pressing element C1 as each shaft MT0 is shifted.

Thus, any shaft MT0 with vertical displacement results in the automatic repositioning of the pressing element C1, maintaining the constant tension of each transmission element MT. Normally, only one transmission element MT is in contact with the pressing element C1. However, depending on the application of this invention, the pressing element C1 may be dimensioned to be in contact with more than one transmission element MT simultaneously.

For this purpose, the automatic tensioner assembly C comprises a static base C2 for its fixation to the machine M and for coupling of a mobile base C3 to support the pressing element C1. Thus, the static base C2 is conveniently installed on the machine M, so it can act as a support for the mobile base C3. The mobile base C3 has its movement conditioned to the movement of each transmission element MT in contact with the pressing element C1.

Moreover, the mobile base C3 exerts a convenient force, having its movement occurring in the right measure as each shaft MT0 is displaced and each transmission element MT is constantly tensioned.

Preferably, the automatic tensioner assembly C comprises an elastic element C5 for controlling the movement of the mobile base C3 relative to the static base C2. Thus, the elastic element C5 is dimensioned to exert the appropriate force, so that the movement of the mobile base C3 occurs in the right measure, as each shaft MT0 is displaced.

In an example of a preferred embodiment of this invention, the static base C2 comprises a first niche C21 for installing a first coupling segment C50 of the elastic element C5, while the mobile base C3 comprises a second niche C30 for installing a second coupling segment C51 of the elastic element C5 for pressing constantly the mobile base C3 in a rotation direction around a turning point C31 of the mobile base C3 on the static base C2.

Therefore, the elastic element C5 can be easily coupled between the static base C2 and the mobile base C3, forming a spring that controls the rotation of the mobile base C3 as the pressing element C1 receives a force of greater or lesser intensity from its contact with each transmission element MT.

In addition, preferably, to allow convenient support of each transmission element MT, the pressing element C1 has a cam shape, and is provided with a linear contact surface C10 followed by a contour surface C11, which determines the pressure point of each transmission element MT.

In an embodiment of the present invention, the pressing element C1 comprises a static fitting element C12 of the pressing element C1 in a first fitting opening C32 of the mobile base C3, facilitating the fitting of the pressing element C1 in the mobile base C3 and ensuring that it does not move without the mobile base C3 being also moved.

Additionally, in an embodiment of the present invention, in order to facilitate its installation on the machine M, the automatic tensioner assembly C comprises a static fastening element C4 for fitting a second fitting opening C20 of the static base C2 on the machine M.

Preferably, the static fitting element C12 comprises a regular polygonal shape compatible with the shape of the first fitting opening C32. Similarly, the static fastening element C4 comprises a regular polygonal shape compatible with the shape of the second fitting opening C20.

Thus, adjusting the positioning of the pressing element C1 is facilitated, as both the static base C2 and the pressing element C1 itself can be coupled in different positions, since regular polygon formats, with identical edge lengths of the static fitting element C12 and the static fastening element C4, allow coupling to be made in different positions.

In addition, in an embodiment of a preferred application for the present invention, the guiding device D and the automatic tensioner assembly C are installed in the same machine M, so that the displacement of any bearing assembly S1 housing a shaft MT0 results in position adjustments, in a convenient and automatic way, of both guiding device D and automatic tensioner assembly C, simultaneously.

Figure 21:
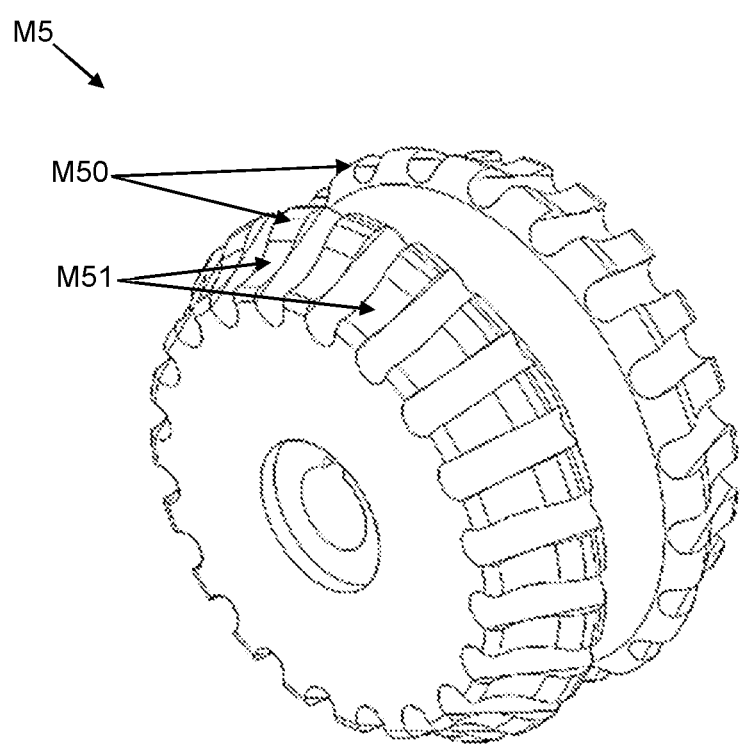
FIG. 21 illustrates a perspective view of an embodiment for the configuration of the pressing assembly M5.

Finally, preferably, as illustrated by FIG. 21, the pressing assembly M5 comprises projections of in-depth contact M50 with the giblets (not shown), which extend from concave segments M51. In this manner, the in-depth contact projections M50 achieve a deeper with the giblets (not shown), providing greater grip and better efficiency in separating these giblets (not shown) from the gripping and transporting conveyor chain M2.

The person skilled in the art will readily notice from the description various ways of performing the invention without departing from the scope of the enclosed claims.

What is claimed is:

1. A machine for cleaning fowl giblets, the machine comprising:
    an inlet gutter and an outlet gutter for the giblets;
    a first pre-cleaning roller and a second pre-cleaning roller for the giblets, the pre-cleaning rollers arranged under a guiding assembly directing the giblets to a gripping and transporting conveyor chain for transporting the giblets from the pre-cleaning rollers to a pressing assembly;
    a cutting element and a washing assembly for the giblets; and
    a first steering element arranged alongside a second steering element, wherein the first steering element extends along the length of a cleaning assembly, said cleaning assembly is arranged under the pressing assembly and under the steering elements.

2. The machine according to claim 1, wherein the cleaning assembly comprises:
    cleaning and directing elements installed between an inlet and outlet support and a second support opposite the inlet and outlet support, the inlet and outlet support and the second support supporting edges of each of the cleaning and directing elements to form a cleaning inlet region aligned with the pressing assembly and with the second steering element;
    a cleaning outlet region aligned with the first steering element, directing the giblets to the outlet gutter; and
    lower guiding ducts for coupling and sliding the cleaning assembly along rail rods.

3. The machine according to claim 2, wherein each of the cleaning and directing elements comprises:
    directing lugs distributed along the entire contact surface of each cleaning and directing elements with the giblets.

4. The machine according to claim 1, further comprising a system for adjusting bearing assemblies, said system comprising:
    parallel guiding rails for sliding a first body of a first bearing assembly, wherein each of the parallel guiding rails is fixed to the machine, and the first body moves along the parallel guiding rails by triggering of a first lead screw device; and
    a single guiding rail for sliding a second body of a second bearing assembly, wherein the single guiding rail is fixed to the machine, and the second body moves along the single guiding rail by triggering of a second lead screw device.

5. The machine according to claim 4, wherein the system for adjusting the bearing assemblies further comprises a hole connecting the first body to the first lead screw device,
    wherein the first lead screw device comprises a triggering element, the triggering element is supported by a first retaining support fixed to the machine and is fixed to a connecting element, the connecting element is fixed in the hole of the first body.

6. The machine according to claim 5, wherein the connecting element is a threaded sleeve.

7. The machine according to claim 5,
    wherein the first body comprises parallel ducts to receive the parallel guiding rails, wherein the parallel guiding rails comprise first limit stops limiting movement of the first body, and
    wherein the second body comprises a single duct to receive the single guiding rail, wherein the single guiding rail comprises at least a second limit stop limiting movement of the second body.

8. The machine according to claim 4, wherein the second body comprises:
    a connecting horizontal hole to a beveled end of a shaft, wherein the beveled end is has a first vertical hole; and
    a second vertical hole communicating with the connecting horizontal hole, wherein the second vertical hole is aligned with the first vertical hole in a shaft mounting position through the connecting horizontal hole,
        wherein the shaft is connected to the second lead screw device supported by a second retaining support fixed to the machine, wherein the second lead screw device crosses the second vertical hole and connects with the first vertical hole.

9. The machine according to claim 4, further comprising:
    a guiding device of the gripping and transporting conveyor chain, wherein displacement of the guiding device corresponds to displacement of the bearing assemblies of peripheral gears that move the gripping and transporting conveyor chain.

10. The machine according to claim 9, wherein the guiding device comprises
    a supporting and protecting element of a longitudinal contact element, wherein the supporting and protecting element is coupled to the bearing assemblies, wherein
        the supporting and protecting element comprises a support segment provided with coupling edges in the bearing assemblies, and
        the longitudinal contact element comprises a contact body provided with a continuous lower duct for laying the gripping and transporting conveyor chain, wherein
            the contact body comprises lower connection regions arranged in positions corresponding to positions of upper connection regions of the support segment, and
            each of the upper connection regions is fastened together with one of the lower connection regions by means of a fastening element; and
    protecting members for fitting of the coupling edges in the bearing assemblies.

11. The machine according to claim 1, wherein the machine further comprises:
    a first auxiliary washing assembly facing a region defined between ends of the pre-cleaning rollers and a beginning of the gripping and transporting conveyor chain; and
    adjusting devices installed on a pair of self-compensating bearing assemblies to promote adjustment of position and relative distance between the first pre-cleaning roller and the second pre-cleaning roller,
        wherein each of the pair of self-compensating bearing assemblies comprises a duct that accommodates an adjusting device of a position of the first pre-cleaning roller, and
            wherein the adjusting device comprises an adjustable triggering element and a resilient element arranged in constant contact with the adjustable triggering element.

12. The machine according to claim 11, wherein each of the pair of self-compensating bearing assemblies further comprises:
- a first oblong hole to accommodate a first adapting sleeve which is slidable inside the first oblong hole and receives one edge of the first pre-cleaning roller, and the first oblong hole is interconnected with the duct, wherein the resilient element is arranged in contact with the first adapting sleeve; and
- a second oblong hole to accommodate a second adapting sleeve, which is fixed inside the second oblong hole and receives one of the ends of the second pre-cleaning roller.

13. The machine according to claim 12, wherein the first pre-cleaning roller and the second pre-cleaning roller each comprise a cleaning cylinder adjacently arranged to one of the two adapting sleeves.

14. The machine according to claim 11, wherein the triggering element is a screw with a nut and the resilient element is a spring.

15. The machine according to claim 1, wherein the machine further comprises an adjustment assembly comprising:
- a main base to support a bearing of the cutting element and a secondary base for supporting a motor; and
- a belt tensioning device and a regulating element manually movable along an adjusting element triggered by a handler to arrange the cutting element.

16. The machine according to claim 1, further comprising:
- a first external bearing of the first steering element and a second external bearing of the second steering element, wherein
  - the first and second external bearings are installed on an outer side of a side wall of the machine, wherein
    - the first external bearing comprises oblong holes for adjustable installation of fasteners throughout each of the oblong holes;
    - the second external bearing comprises oblong holes for adjustable installation of fasteners throughout each of the oblong holes.

17. The machine according to claim 1, further comprising actuating elements for controlling opening, closing and intermediate opening positions of covers of the machine.

18. The machine according to claim 1, further comprising:
- an automatic tensioner assembly provided with a pressing element for contact and constant pressure of at least one transmission element, interconnecting gears installed on shafts,
  - wherein at least one of the shafts can be moved for position adjustment, resulting in a variable positioning of the pressing element as each of the shafts is shifted.

19. The machine, according to claim 18, wherein the automatic tensioner assembly comprises:
- a static base for its fixation to the machine and for coupling of a mobile base to support the pressing element,
  - wherein the pressing element comprises a static fitting element of a first fitting element in a first fitting opening of the mobile base, the static fitting element comprises a regular polygonal shape compatible with a shape of the first fitting opening, and
  - wherein the pressing element has a cam shape, and is provided with a linear contact surface followed by a contour surface;
- an elastic element for controlled movement of the mobile base relative to the static base,
  - wherein the static base comprises a first niche for installing a first coupling segment of the elastic element, and
  - wherein the mobile base comprises a second niche for installing a second coupling segment of the elastic element for constantly pressing the mobile base in a rotation direction around a turning point of the mobile base on the static base; and
- a static fastening element for fitting a second fitting opening of the static base on the machine,
  - wherein the static fastening element comprises a regular polygonal shape compatible with a shape of the second fitting opening.

20. The machine according to claim 1, wherein the pressing assembly comprises projections of in-depth contact with the giblets extending from concave segments.

* * * * *